US009120329B2

(12) United States Patent
Kimura

(10) Patent No.: US 9,120,329 B2

(45) Date of Patent: Sep. 1, 2015

(54) PRINTING APPARATUS FOR PRINTING ON PRINT RECEIVING TAPE, PRINTING METHOD AND RECORDING MEDIUM

(71) Applicant: Casio Computer Co., Ltd., Tokyo (JP)

(72) Inventor: Satoshi Kimura, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 4 days.

(21) Appl. No.: 13/623,421

(22) Filed: Sep. 20, 2012

(65) Prior Publication Data

US 2013/0070261 A1 Mar. 21, 2013

(30) Foreign Application Priority Data

Sep. 20, 2011 (JP) ................................ 2011-204488

(51) Int. Cl.

*G06K 15/02* (2006.01)
*G06F 3/12* (2006.01)
*B41J 3/407* (2006.01)
*B41J 3/46* (2006.01)

(52) U.S. Cl.

CPC . *B41J 3/4075* (2013.01); *B41J 3/46* (2013.01)

(58) Field of Classification Search

CPC ... G06K 15/02; G06F 3/1296; H04N 1/00204
USPC ..................................... 358/520, 1.2; 434/112
See application file for complete search history.

(56) References Cited

U.S. PATENT DOCUMENTS

2005/0221260 A1* 10/2005 Kikuchi et al. ............... 434/112
2009/0016647 A1* 1/2009 Hamaguchi .................. 382/305
2011/0222946 A1 9/2011 Murayama

FOREIGN PATENT DOCUMENTS

JP 2002366133 A 12/2002
JP 2004287671 A 10/2004
JP 2009178850 A 8/2009
JP 2011-073336 4/2011

OTHER PUBLICATIONS

Chinese Office Action dated May 29, 2014 issued in counterpart Chinese Application No. 201210433484.X.
Japanese Office Action dated Jan. 15, 2015, issued in counterpart Japanese Application No. 2011-204488.

* cited by examiner

*Primary Examiner* — Marcus T Riley

(74) *Attorney, Agent, or Firm* — Holtz, Holtz, Goodman & Chick PC

(57) ABSTRACT

A printing apparatus includes an image data generating device to generate image data based on a touch detection signal supplied from a written character inputting area of a touch panel inputting device, a blank space detecting device to detect and identify line data and blank space data based on the image data, an alignment processing device to delete the blank space data from the image data and to align the remaining line data end to end in a tape conveying direction of a print receiving tape, a printing data generating device to generate printing data by executing a size conversion of the line data aligned end to end so as to match the line data to a tape width, and a printing processing device to execute a printing process on the print receiving tape based on the printing data.

15 Claims, 12 Drawing Sheets

PRINTING APPARATUS FOR PRINTING ON PRINT RECEIVING TAPE, PRINTING METHOD AND RECORDING MEDIUM

CROSS-REFERENCE TO RELATED APPLICATION

This application is based upon and claims the benefit of priority under 35 USC 119 of Japanese Patent Application No. 2011-204488 filed on Sep. 20, 2011, the contents of which, including the description, claims, drawings and abstract, are incorporated herein by reference.

BACKGROUND OF THE INVENTION

1. Field of the Invention

The present invention relates to a printing apparatus for printing on a print receiving tape, a printing method and a recording medium that records a program that makes a computer execute the printing method.

2. Description of the Related Art

There is known a printing apparatus which can produce a label, a tag, a slip with a memo or the like by setting a cassette which accommodates a tape member, which is a print receiving tape, in the apparatus and arbitrarily printing on the tape member characters and the like that are inputted from an inputting device such as a keyboard or that are outputted from other equipment.

In addition, Japanese Unexamined Patent Application No. 2011-73336 discloses a printing apparatus that includes a touch panel as an inputting device and which has a hand writing inputting function.

In the printing apparatus having the hand writing inputting function as described above, for example, image data is generated based on touch detection signals from a character inputting area on the touch panel, the image data generated is reduced to match the width of the print receiving tape, and printing is made on the print receiving tape.

In the printing apparatus in which the printing process is executed in the way described above, however, for example, when a narrow print receiving tape is set in the apparatus and the user inputs handwritten data in a narrow space within the character inputting area, since the character inputting area is simply reduced to match the width of the print receiving tape, there is caused a problem that the characters printed on the tape become too small to be read and as a result, the visibility becomes decrease. Additionally, the print receiving tape on which printing is made in that way deteriorates its function as a label, a tag or a slip with a memo from time to time.

BRIEF DESCRIPTION OF THE INVENTION

Then, the invention has been made with a view to solving the problems and an object thereof is to provide a printing apparatus that can make highly visible printing on a print receiving tape even when the user inputs handwritten data in the narrow space within the character inputting area, a printing method used in the printing apparatus and a recording medium in which a program is recorded which realizes the printing method in the printing apparatus.

According to an aspect of the invention, there is provided a printing apparatus that prints on a print receiving tape, comprising a image data generating device configured to generate image data based on a touch detection signal supplied from a touch panel when the touch panel is touched to execute a hand writing input, a blank space detecting device configured to detect and identify, based on the image data so generated, line data that corresponds to an area where the hand writing input is executed by the touch panel and blank space data that corresponds to an area where the hand writing input by the touch panel is not executed, a printing data generating device configured to generate printing data by executing a size conversion of the line data that is obtained by deleting the blank space data from the image data so as to match the line data to the print receiving tape, and a printing processing device configured to execute a printing process based on the printing data.

Additionally, according to another aspect of the invention, there is provided a printing apparatus that prints on a print receiving tape, comprising a image data generating device configured to generate image data based on a touch detection signal supplied from a touch panel when the touch panel is touched to execute a handwriting input and a printing control unit configured, when drawing patterns in a multi-line are identified from the image data, to align the drawing patterns into a single line for printing on the print receiving tape.

Further, according to a further aspect of the invention, there is provided a printing method for a printing apparatus that prints on a print receiving tape, comprising a process that generates image data based on a touch detection signal supplied from a touch panel when the touch panel is touched to execute a hand writing input, a process that detects and identifies, based on the image data so generated, line data that corresponds to an area where the handwriting input is executed by the touch panel and blank space data that corresponds to an area where the hand writing input by the touch panel is not executed, a process that generates printing data by executing a size conversion of the line data that is obtained by deleting the blank space data from the image data so as to match the line data to the print receiving tape, and a process that executes a printing process based on the printing data.

Furthermore, according to an aspect of the invention, there is provided a recording medium that records a program that makes a computer execute a printing method, recording a program that makes a computer execute a process of generating image data based on a touch detection signal supplied from a touch panel when the touch panel is touched to execute a hand writing input, a process of detecting and identifying, based on the image data so generated, line data that corresponds to an area where the hand writing input is executed by the touch panel and blank space data that corresponds to an area where the hand writing input by the touch panel is not executed, a process of generating printing data by executing a size conversion of the line data that is obtained by deleting the blank space data from the image data so as to match the line data to the print receiving tape, and a process of executing a printing process based on the printing data.

According to the invention, it is possible to provide the printing apparatus that can make highly visible printing on the print receiving tape even when the narrow print receiving tape is set in the printing apparatus and the user inputs handwritten data in the narrow space within the character inputting area, the printing method for the printing apparatus and the recording medium that records the program that realizes the printing method for the printing apparatus.

DETAILED DESCRIPTION OF THE INVENTION

Figure 1:
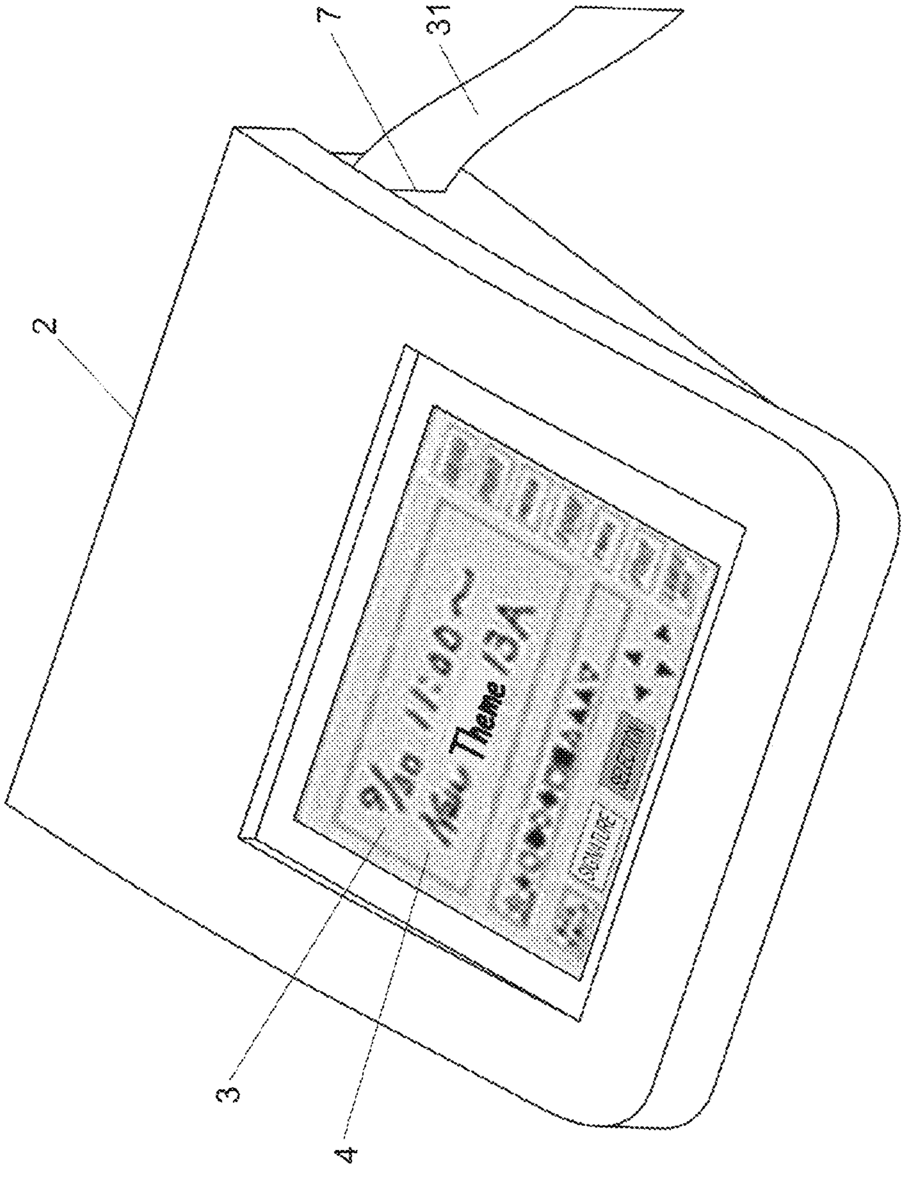
FIG. 1 is a perspective view of a printing apparatus according to an embodiment of the invention.

Hereinafter, an embodiment of the invention will be described in detail based on the drawings. FIG. 1 is a perspective view of a printing apparatus 1 according to an embodiment of the invention.

The printing apparatus 1 includes on an upper side of a casing 2 a touch panel display 3 that is made up of a liquid crystal display or the like. A touch panel input device 4 is placed on the touch panel display 3. Specifically, this touch panel input device 4 functions as a character inputting device and is made up of transparent pressure switches or the like. The touch panel input device 4 is disposed in an overlap fashion on a display screen of the touch panel display 3. To be in detail, a touch panel includes the touch panel display 3 and the touch panel input device 4.

As will be described later, a tape cassette that accommodates a tape member 31 or the like as a print receiving tape is formed so as to be detachably mounted inside an opening/closing lid that is prepared on a back side of the casing 2. A tape feed-out portion 7 is formed in a lateral side of the casing 2, and the tape member 31 on which printing is made is fed out of the casing 2 through this tape feed-out portion 7.

Figure 2A:
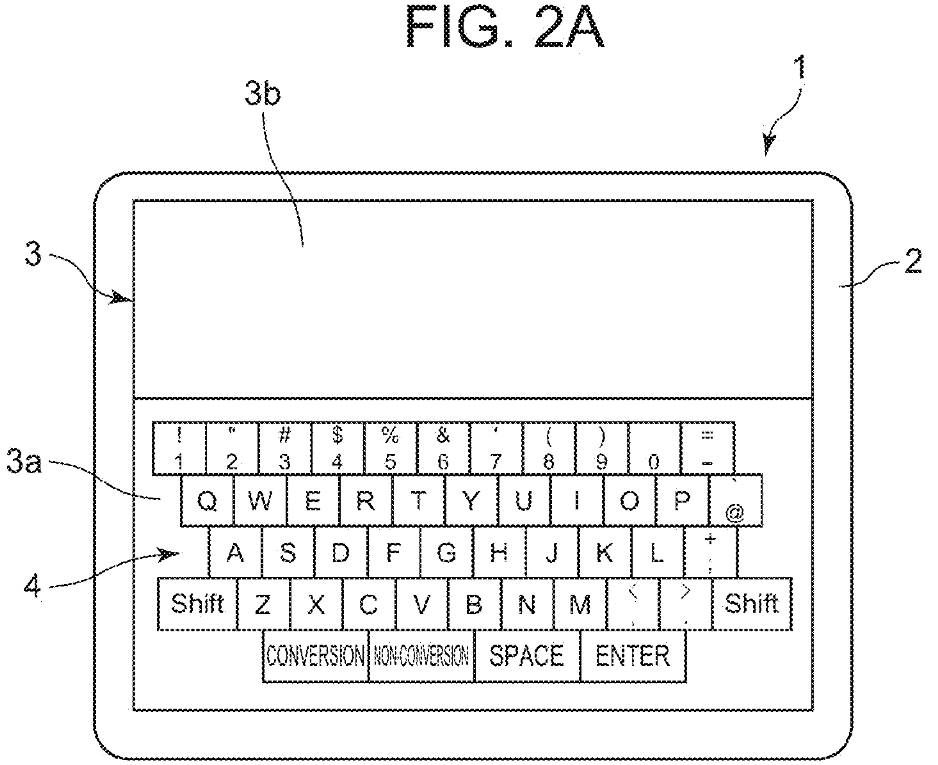
FIG. 2A and FIG. 2B are a diagram showing examples of ways in which a touch panel of the printing apparatus according to the embodiment of the invention is used.

FIG. 2 shows examples of ways in which the touch panel display 3 and the touch panel input device 4 of the printing apparatus are used. Specifically, FIG. 2A is a diagram showing an example of a display screen employed in a software keyboard input mode, and FIG. 2A is a diagram showing an example of a display screen displaying a character input area employed in a handwritten data input mode.

The printing apparatus 1 has a software keyboard input mode and a hand writing input mode as input modes, and the respective modes can be switched. In the software keyboard input mode, as shown in FIG. 2A, the printing apparatus 1 displays an imaginary keyboard on the touch panel display 3 in the casing 2 by a software keyboard function. Provided on the display screen of the touch panel display 3 are a keyboard area 3*a* that displays an imaginary keyboard including character/symbol input keys such as alphabetic character keys, number keys and symbol keys (hereinafter, these keys being referred generally as character keys) and control keys such as a conversion key for conversion to kanji, a no-conversion key and an execution key and a character editing area 3*b* that displays characters inputted from the keyboard area 3*a*. The respective keys of the touch panel input device 4 are displayed in the keyboard area 3*a*, and by pressing the positions of the keys that are displayed on the display screen as the touch panel input device 4 with a fingertip or a touch pen, data on coordinate positions of the keys so pressed are inputted. The software keyboard is made up of the touch panel display 3 and the touch panel input device 4.

Figure 2B:
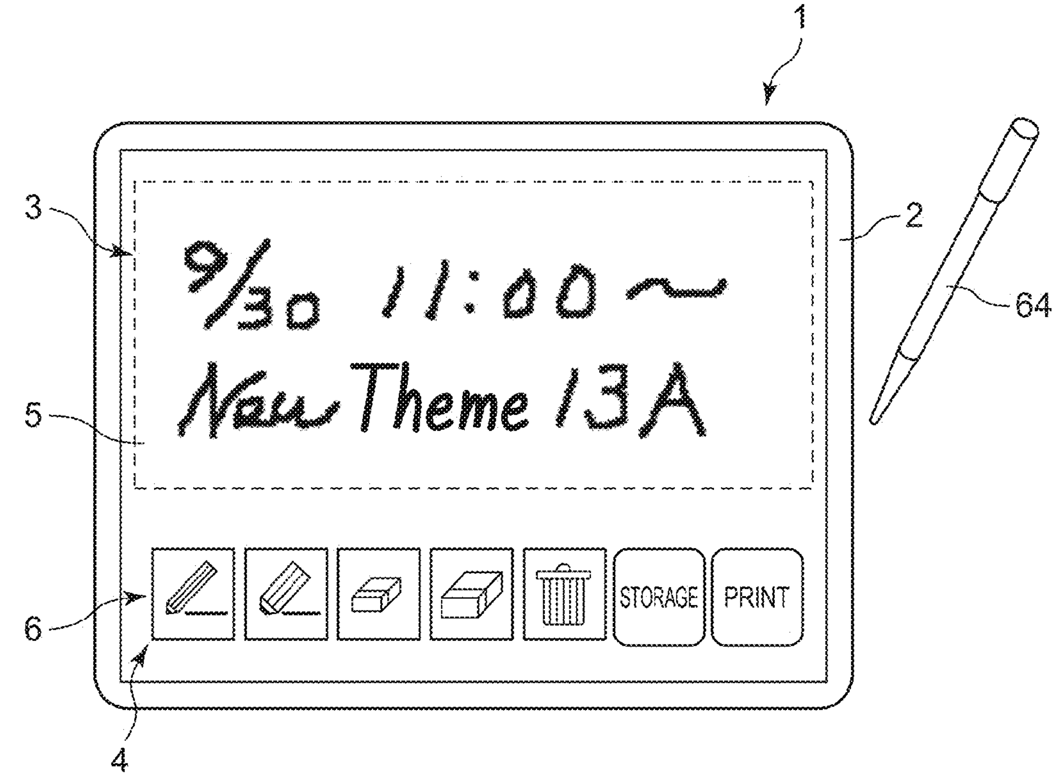

Additionally, in the printing apparatus 1 which is in the hand writing input mode, as shown in FIG. 2B, provided on the display screen of the touch panel display 3 are a hand written character input area 5 as a hand written character input device and an imaginary key area 6 that includes control keys such as a thin line setting key, a thick line setting key, a small eraser setting key, a large eraser setting key, a delete key, a save key and a printing key. In the printing apparatus 1, when the touch panel input device 4 is pressed by a touch pen 64, for example, which is a stylus pen, or a fingertip of the operator in the handwritten character input area 5, image data as a hand written character is formed based on data on coordinate positions of the keys so pressed. The key area 6 displays the control keys as images and functions as the touch panel input device 4, whereby by pressing the positions of the keys displayed on the display screen, data on coordinate positions of the keys so pressed is inputted.

The printing apparatus 1 according to the embodiment is an apparatus that prints characters or the like on the tape member 31 as a print receiving tape which is formed by laminating together a print receiving tape layer of which a front surface is made into a print receiving surface and a rear surface is made into an adhesive surface with an adhesive and a release tape layer that is affixed to the adhesive surface.

Figure 3:
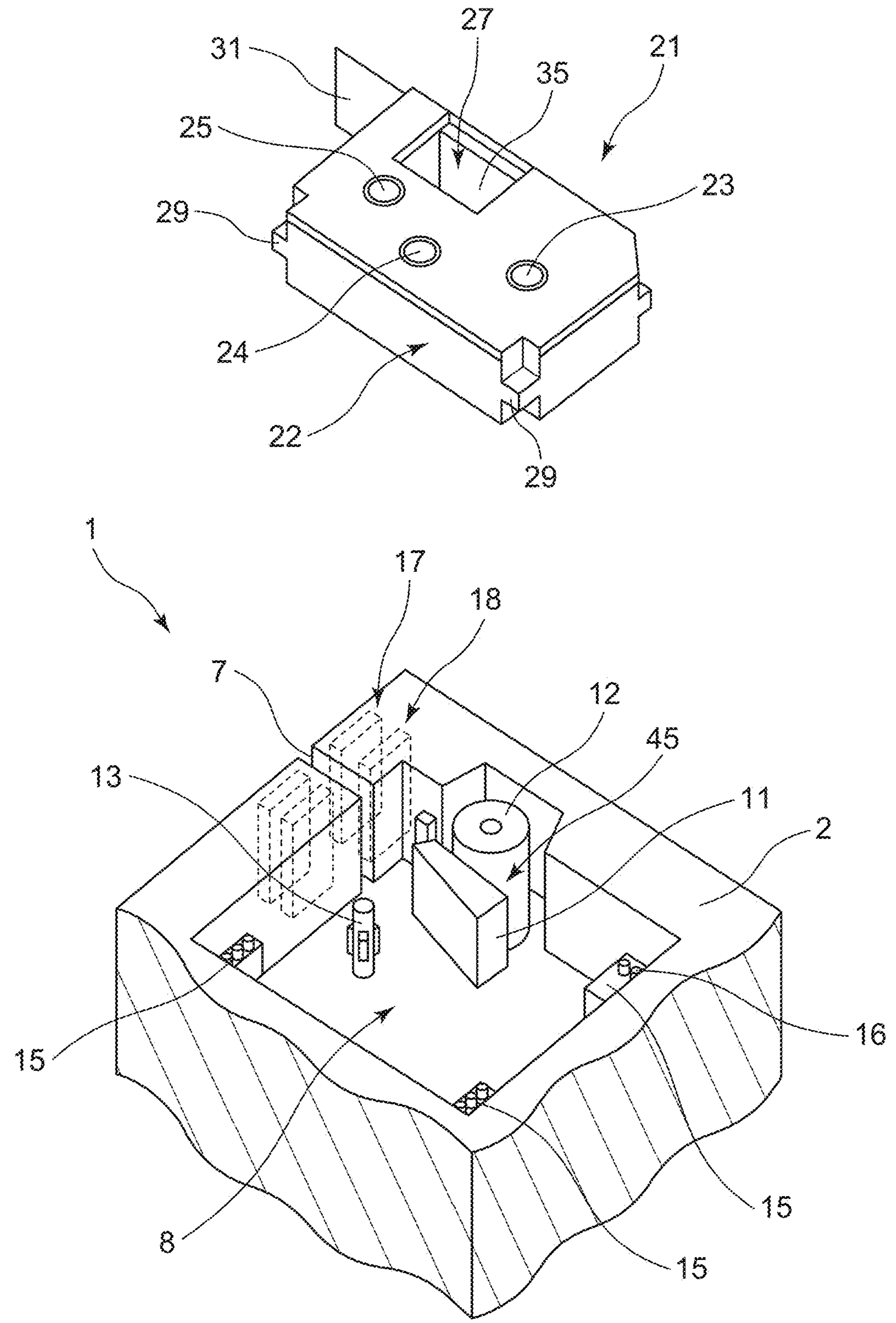
FIG. 3 shows an enlarged view of an interior of the printing apparatus according to the embodiment of the invention and a perspective view of a tape cassette.

FIG. 3 shows an enlarged view of an interior of the printing apparatus 1 and a perspective view of a tape cassette. A cassette loading portion 8 is formed inside an opening/closing lid that is prepared on a back side of the casing 2 for loading a tape cassette 21, as shown in FIG. 3. This tape cassette 21 accommodates the tape member 31 and an ink ribbon 35. A tape printing mechanism 45 and cassette receiving portions 15 are formed in the cassette loading portion 8, and the cassette receiving portions 15 support the tape cassette 21 in a predetermined position.

The tape printing mechanism 45 includes printing elements that are arranged in a vertical direction, a thermal head 11 of a printing head as a printing device, a platen roller 12 that holds the tape member 31 and the ink ribbon 35 between the thermal head 11 and itself to convey them and a ribbon take-up shaft 13 that takes up the ink ribbon 35 that has been used for printing into the tape cassette 21.

Additionally, the tape feed-out portion 7 that communicates with the outside of the casing 2 is formed in one end portion of the cassette loading portion 8. A full cutting mechanism 17 as a full cutting device for cutting the print receiving tape layer and the release tape layer of the tape member 31 in a widthwise direction and a half cutting mechanism 18 as a half cutting device for cutting only the print receiving tape layer of the tape member 31 are incorporated in the tape feed-out portion 7.

Further, the tape cassette 21 includes a cassette case 22, and this cassette case 22 accommodates in an interior thereof a tape core 23 around which the tape member 31 is wound, a ribbon supply core 24 around which the ribbon 35 that has not yet been used is wound and a ribbon take-up core 25 that takes up the ink ribbon 35 that has been used. Additionally, a head disposing portion 27 is formed in the cassette case 22 of the tape cassette 21, and when the tape cassette 21 is loaded in the cassette loading portion 8, the thermal head 11 is received in this head disposing portion 27.

In addition, engaged portions 29 are formed in corners of the cassette case 22, and these engaged portions 29 are brought into engagement with the cassette receiving portions 15 in the cassette loading portion 8 to thereby be supported by the cassette receiving portions 15. Additionally, although not shown, predetermined irregularities are formed at the engaged portions 29 of the cassette case 22. Irregularities are formed so as to correspond to types of tape cassettes 21. On the other hand, tape width detection switches 16 are formed on the cassette receiving portions 15 in the cassette loading portion 8. The tape width detection switches 16 distinguish between the irregularities formed at the engaged portions 29 of the cassette case 22 when the tape cassette 21 is loaded.

In the printing apparatus 1, when the cassette case 22 is loaded in the cassette loading portion 8, some or all of the engaged portions 29 of the cassette case 22 and the tape width detection switches 16 formed at the cassette receiving portions 15 in the cassette loading portion 8 are brought into engagement with each other, whereby the tape width detection switches 16 engaged are pressed. Then, by the combination of the tape width detection switches 16 that are in the ON state, the type of the type member 31 in the cassette case 22 including its tape width can be identified.

Namely, in this printing apparatus 1, since different types of tape members 31 are incorporated in different cassette cases 21, by distinguishing between the different types of cassette cases 21, for example, widths of the tape members 31 which are target objects for printing can be identified, whereby a control unit 40 can prepare printing data that is suitable for the width of the tape member 31 in the identified tape cassette 21.

In this printing apparatus, when instructed to start printing, the tape member 31 and the ink ribbon 35 are fed out of the tape cassette 21 and are then sandwiched between the platen roller 12 and the thermal head 11 in such a state that the tape member 31 and the ink ribbon 35 are superposed one on the other for conveyance.

Then, the thermal head 11 is heated and driven based on printing data, and an ink in the ink ribbon 35 is thermally transferred to the print receiving tape layer of the tape member 31 for printing on the print receiving tape layer. Then, when printing ends, the full cutting mechanism 17 or the half cutting mechanism 16 is actuated according to setting, whereby the tape member 31 is cut in the widthwise direction, preparing a label in the form of a tape.

Figure 4:
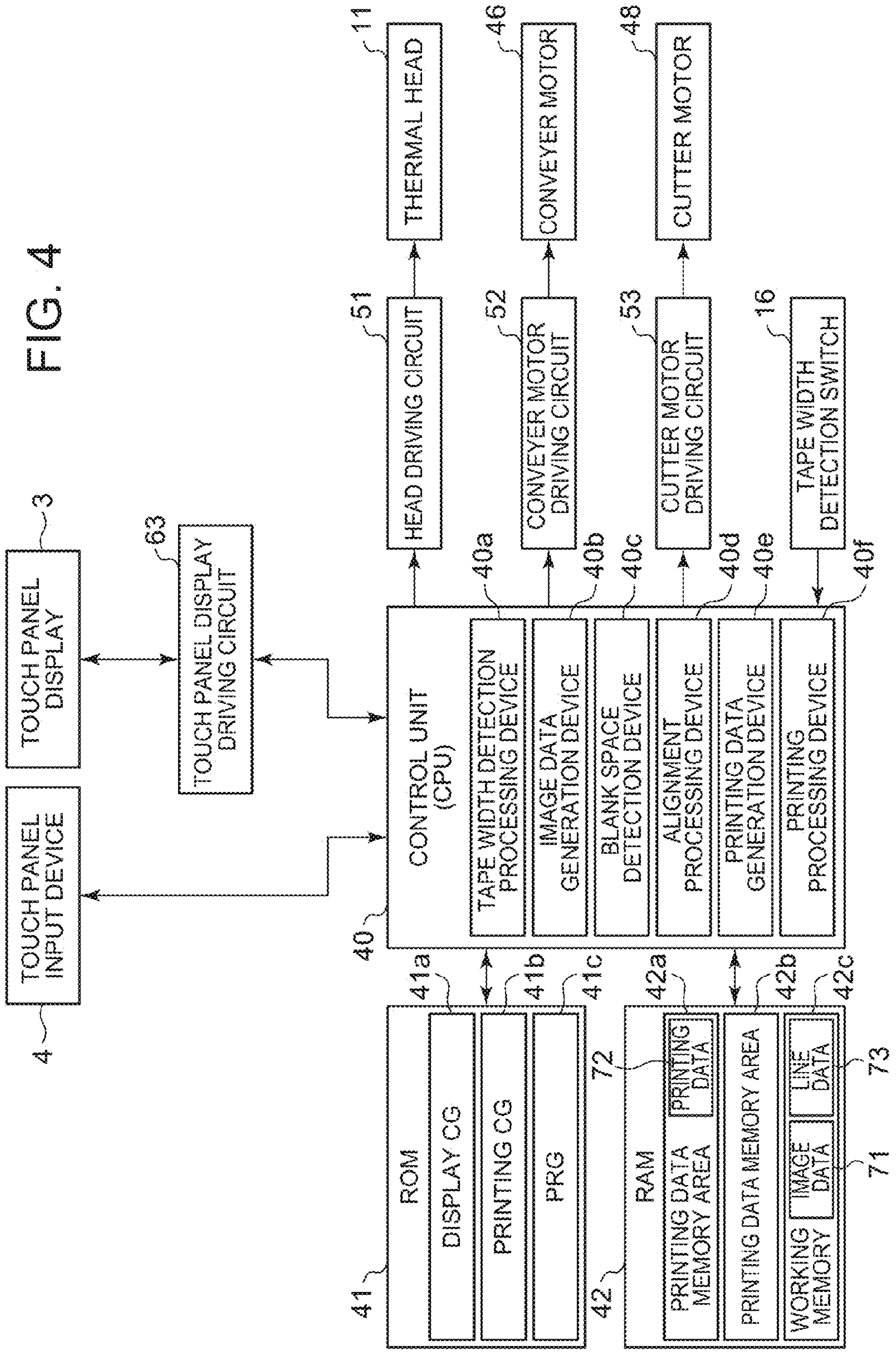
FIG. 4 is a functional block diagram of the printing apparatus according to the embodiment of the invention.

Next, a circuitry configuration of the printing apparatus 1 will be described. As shown in FIG. 4, the printing apparatus 1 includes the control unit 40. A ROM 41 and a RAM 42 are connected to the control unit 40 as storage devices. Additionally, the touch panel input device 4 is connected to the control unit 40 as the inputting device that inputs character data and a font size which result from key operations by the user, as well as handwritten characters or pictures (hereinafter, referred to as characters and the like). A touch panel display driving circuit 63 is connected to the control unit 40, and this touch panel display driving circuit 63 drives the touch panel display 3 which is the display device that displays various pieces of information including information inputted.

Further, connected to the control unit 40 are a head driving circuit 51 that drives the thermal head 11, a conveyer motor driving circuit 52 that is a step motor driving circuit that drives a conveyer motor 46 which is a step motor and a cutter motor driving circuit 53 that drives a cutter motor 48.

In addition, the tape width detection switches 16 are connected to the control unit 40, the tape width detection switches 16 being cartridge distinguishing device that distinguishes between types of cartridges.

Additionally, the control unit 40 is a CPU and executes, according to an input signal from the touch panel input device 4, a system program that is automatically stored in advance in the ROM 41, a control program stored in a memory card, a control program read in from an external device and a program (PRG) 41*c* that realizes a function according to the invention or the like and controls the respective operations of the circuit devices using the RAM 42 as a working memory 42*c* which is a working area.

The ROM 41 stores a program that displays and prints set character data or the like and printing fonts, oblique lines and meshes for use in shading or painting out, and dot patterns or the like. Thus, the ROM 41 also functions as a recording medium that stores programs that can be read by the control unit 40.

Additionally, the ROM 41 has a display CG (character generator) 41*a* that stores pattern data of display fonts, a printing CG that stores printing pattern data and the aforesaid program 41*c*.

The RAM 42 includes a printing data memory area 42*a* that stores printing data 72 which is printing information, a display data memory area 42*b* that stores pattern data to be displayed on the touch panel display 3 and the working memory 42*c* functioning as the working area that includes image data 71, line data 73 that is extracted from the image data 71, a register that stores temporarily data necessary for printing process or the like, a counter and the like.

The head driving circuit 51 controls the thermal head 11 which is the printing device according to the printing data 72 which is the printing information and format setting information and causes the thermal head 11 to execute printing on the tap member 31. The conveyer motor driving circuit 52 is a circuit for driving a conveyer device and controls the conveyer motor 46 that rotates the platen roller 12 and the ribbon take-up shaft, conveying the tape member 31 in a longitudinal direction at a predetermined speed. The cutter motor driving circuit 53 is a driving circuit for controlling the cutting devices such as the full cutting device and the half cutting device and controls a step motor as the cutter motor 48 that is used in the full cutting mechanism 17 and a DC motor as the cutter motor 48 used in the half cutting mechanism 18.

Additionally, the control unit 40 executes the program 41*c* to realize functions of a tape width detection processing device 40*a*, a image data generation device 40*b*, a blank space detection device 40*c*, an alignment processing device 40*d*, a printing data generation device 40*e* and a printing processing device 40*f* in the printing apparatus 1.

The program 41*c* stored in the ROM 41 realizes in the control unit 40 a process of detecting the width of the tape member 31 that is the print receiving tape based on signals from the tape width detection switches 16 as the tape width detection processing device 40*a*.

In addition, the program 41*c* realizes in the control unit 40 a process of generating image data 71 based on detection signals (hereinafter, referred to as touch detection signals) from a group of touch detection sensors arranged into a matrix at a density that provides for a predetermined resolution in the handwritten character input area 5 of the touch panel inputting device 4 as the image data generation device 40*b*. Note that the image data 71 is generated according to output values of the touch detection sensors and is then converted into a binary image data that is made up of a collection of dot images. Consequently, hereinafter, a value of "0" or "1" that is represented by each dot image that is generated in correspondence with a touch detection sensor output is referred to as a "dot value."

In addition, the program 41*c* realizes in the control unit 40 a process of detecting and identifying the line data 73, an upper blank space and a lower blank space based on a dot value of each of horizontal lines of the image data 71 as the blank space detection device 40*c*. Additionally, when extracting a plurality of line data 73 in the image data 71, the blank space detection device 40*c* executes a process of identifying an interlinear spacing between the extracted line data 73. Further, the blank space detection device 40*c* executes a process of identifying a front blank space, a rear blank space and line data 73 based on a dot value of each of vertical lines in the image data 71.

Additionally, for example, when a plurality of line data 73 and an interlinear spacing are extracted from the image data 71, the program 41*c* realizes in the control unit 40 a process of aligning the plurality of line data 73 end to end along a conveying direction of the tape member 31 that is the print receiving tape as the alignment processing device 40*d*. In addition, this alignment processing device also executes a process of providing a blank space between the plurality of line data 73 so aligned.

Additionally, when the upper blank space and the lower blank space are wider than a specified value, the program 41*c* realizes in the control unit 40 a process of generating printing data 72 by deleting the upper blank space and the lower blank space from the image data 71 and executing a size conversion of enlarging or reducing the line data 73 so as to match the tape width of the tape member 31 that is the print receiving tape as the printing data generating device 40*e*. The control unit 40 sets as the specified value a value that makes better the visibility of prints produced by deleting the upper blank space and the lower blank space than that of prints produced without deleting the upper and lower blank spaces, that is, a value corresponding to on the order of 10% of a vertical width of a handwritten character inputting area 5, for example. This specified value may be determined based on the tape width. Specifically, by setting a smaller value as the tape width gets narrower, the deletion of the upper blank space and the lower blank space is made easier as the tape width of the tape member 31 gets narrower.

Additionally, the program 41*c* realizes in the control unit 40 a printing process as the printing processing device 40*f* by controlling the head driving circuit 51 and the thermal head 11 which constitute the printing device based on the printing data 72 into which the plurality of line data 73 are aligned.

With the control unit 40 controlling the head driving circuit 51, the conveyer motor driving circuit 52 and the cutter motor driving circuit 53, the printing device 1 can print inputted handwritten characters or a character string on the tape member 31 and cut the tape member 31 in a predetermined position to thereby prepare a label.

Figure 5:
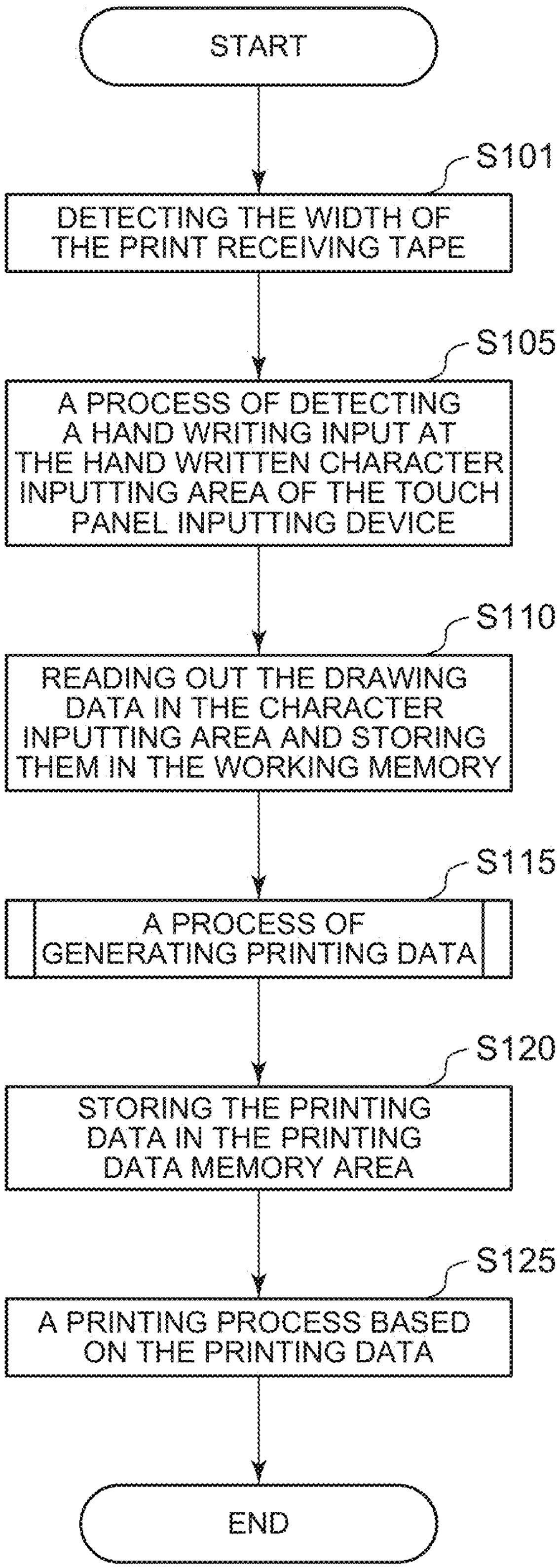
FIG. 5 is a flowchart showing an example of the operation of a printing process executed by the printing apparatus according to the embodiment of the invention.

Next, the operation of a label preparing printing process of the printing apparatus 1 according to the embodiment of the invention will be described in detail by use of the drawing. FIG. 5 is a flowchart showing an example of an operation of a printing process executed by the printing apparatus 1 according to the embodiment of the invention.

In the printing apparatus 1, when a signal signaling that a label preparation mode is selected from a mode setting is inputted from the touch panel inputting device 4 by the operation of the user, the control unit 40 executes the various processes as the label preparation mode.

The control unit 40 executes the tape width detection processing device 40*a* to execute the process of determining on the type of the tape material 31 including the tape width based on the signals signaling the states of the tape width detection switches 16 to thereby detect the width of the tape member 31 which is the print receiving tape (step S101), storing data on the detected tape width in the working memory 42*c* of the RAM 42.

In the touch panel display 3 and the touch panel inputting device 4, as shown in FIGS. 2A and 2B, the software keyboard input mode or the hand writing input mode can be selected.

Next, when a signal that selects either the software keyboard input mode or the hand writing input mode is inputted from the touch panel inputting device 4 by the operation of the user, the control unit 40 sets the input mode based on the signal. In this embodiment, a case will be described in which the hand writing input mode is selected.

The control unit 40 executes a process of detecting a hand writing input at the handwritten character inputting area 5 of the touch panel inputting device 4 (step S105). To describe this in detail, as shown in FIG. 2B, when characters or a message is inputted into the handwritten character inputting area 5 of the touch panel inputting device 4 by the touch pen 64 such as a stylus pen operated by the user, the control unit 40 executes the image data generation device 40*b* to detect the handwriting input based on the signal from the touch pane inputting device 4 and generates image data 71 by the signal from the touch panel inputting device 4 based on a touch detection signal in the handwritten character inputting area 5, and stores the image data 71 in the working memory 42*c* which is the working area of the RAM 42 (step S110).

This handwritten character inputting area 5 is set in advance into an area defined by W horizontal dots and H vertical dots. In this embodiment, the touch panel display 3 and the touch panel inputting device 4 are of the order of 76 mm long and of the order of 51 mm wide. In terms of the numbers of dots, they are defined by 240 horizontal dots and 160 vertical dots. The handwritten character inputting area 5 is of the order of 70 mm long and of the order of 30 mm wide and has a resolution (number of dots) defined by of the order of 220 horizontal dots and of the order of 95 vertical dots.

Next, the control unit 40 executes a process of detecting and identifying the line data 73, an upper blank space and a lower blank space from the image data 71. Then, as will be described later, when an upper blank space and a lower blank space are larger than a specified value, the control unit 40 executes a process of deleting the upper blank space and the lower blank space and then executes a printing data generation process of generating printing data 72 by executing a size conversion on the line data 73 to enlarge or reduce the line data 73 so as to match the line data 73 to the tape width of the tape member 31 which is the print receiving tape (step S115). This process in step S115 will be described in detail later.

Next, storing the printing data 72 in the printing data memory area 42*a* of the RAM 42 (step S120), the control unit 40 executes a printing process based on the printing data 72 (step S125).

Figure 6:
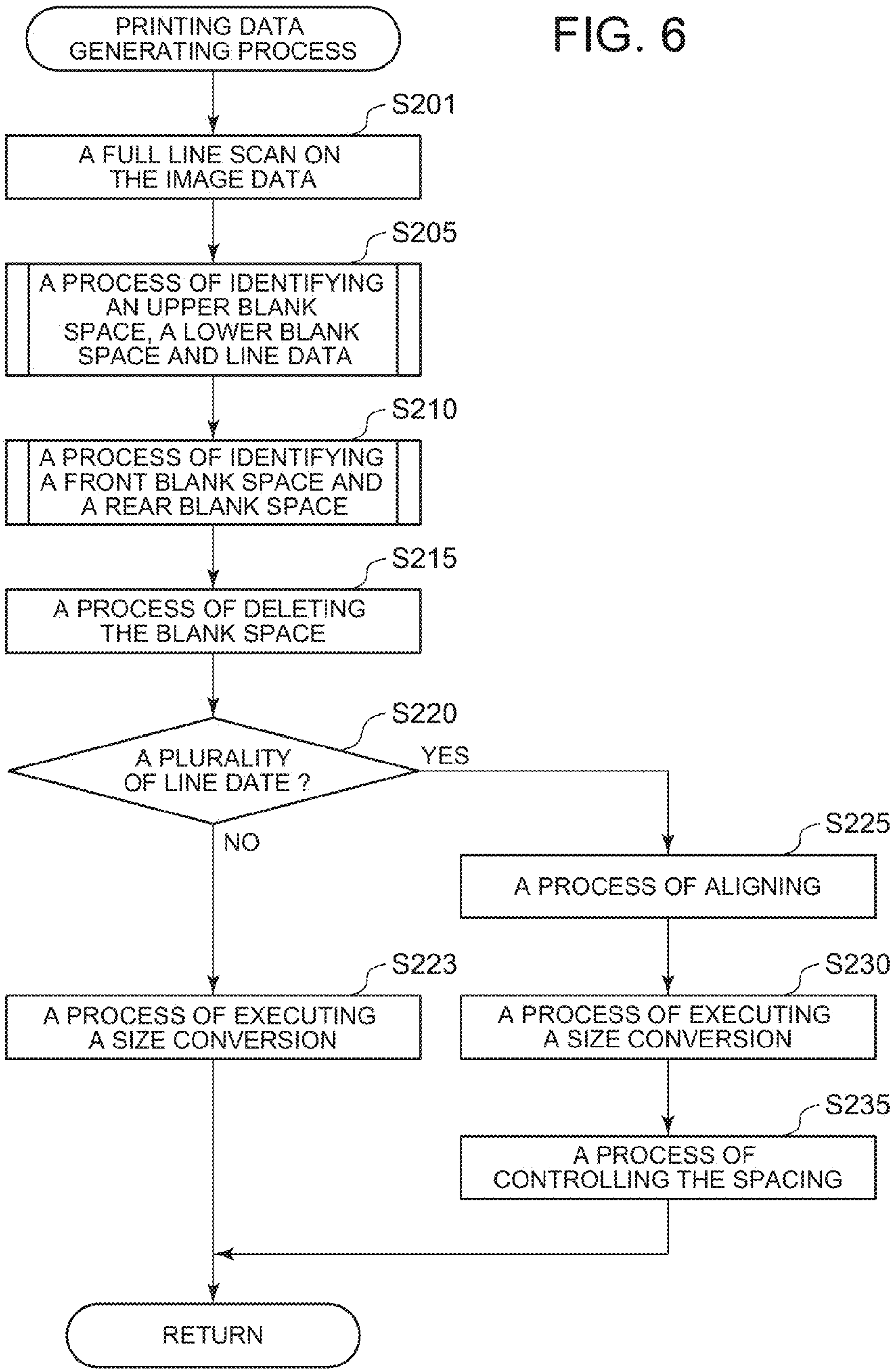
FIG. 6 is a flowchart showing an example of the operation of a printing data generation process executed by the printing apparatus according to the embodiment of the invention.

FIG. 6 is a flowchart showing an example of a printing data generating process executed by the printing apparatus according to the embodiment of the invention. FIG. 7 is a diagram showing a procedure for a label preparation process executed by the printing device 1. The printing data generating process in step S115 will be described by reference to FIGS. 6, 7.

Figure 7A:
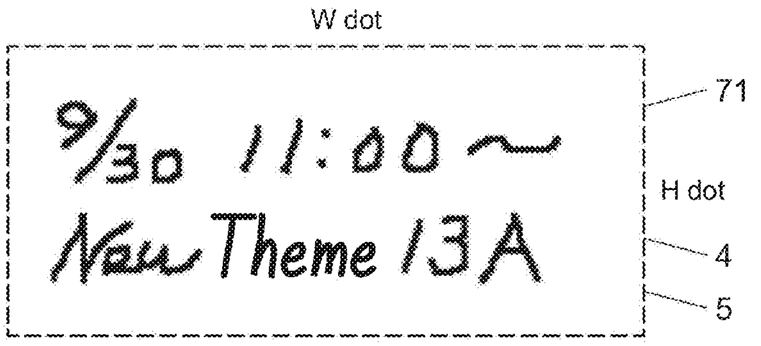
FIGS. 7A, 7B, 7C and 7D are a diagram showing an example of a procedure for a label preparation process executed by the printing apparatus according to the embodiment of the invention.
Figure 7B:
Figure 7C:
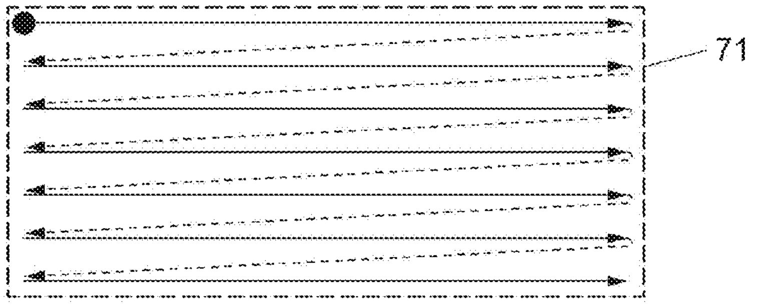

In step S201, the control unit 40 executes a full line scan on the image data 71 that is extracted from the handwritten character inputting area 5 that is defined by the W horizontal dots and H vertical dots in the touch panel inputting device 4, as shown in FIG. 7A. Here, the full line scan is a process of identifying a dot value of each of horizontal lines of the image data 71, that is, whether the dot value is "0" or "1" and the same process is executed sequentially on all the horizontal lines from an upper edge towards a lower edge of the image data 71, as shown in FIGS. 7B, 7C. In this embodiment, the process of identifying whether the dot values of each of the horizontal lines are "0" or "1" is started from a point in a top left-hand side corner towards a top right-hand side corner of the image data 71, and this process is executed line by line to reach a lowermost line.

In this embodiment, while each dot of the image data 71 has a dot value of "0" or "1," the invention is not limited to this form. For example, each dot may be configured to take an arbitrary number of "0" or "255" as the dot value. As this occurs, a threshold is specified to distinguish a character portion from a blank space or blank portion as a background, and when the dot value is equal to or larger than the threshold, the line is determined to constitute the character portion, while when the dot value is smaller than the threshold, the line is determined to constitute the blank space.

Figure 7D:
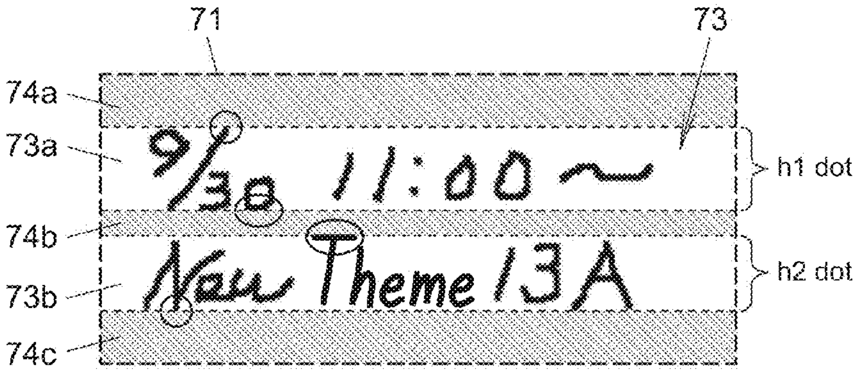

Next, as shown in FIGS. 6, 7D, the control unit 40 executes the blank space detecting device 40*c* to thereby execute a process of identifying an upper blank space 74*a*, a lower blank space 74*c* and line data 73 based on the dot values of each of the horizontal lines in the image data 71 (step S205).

To describe this in detail, as shown in FIG. 7D, the control unit 40 determines an area where a plurality of lines having a dot value of "0" exist continuously downwards from an uppermost line of the image data 71 to be an upper blank space 74*a* and determines an area where a plurality of lines having a dot value of "1" or "more than 1" within one line exist continuously to be line data 73. Additionally, when a plurality of line data 73*a*, 73*b* are detected, the control unit 40 determines an area existing between the plurality of line data 73*a*, 73*b* to be an interlinear spacing 74*b*. In addition, when a plurality of lines having a dot value of "0" continuously exist from a line that follows the line data 73 (73*b*) to a lowermost line, the control unit 40 determines the area in question to be a lower blank space 74*c*. In this embodiment, as shown in FIG. 7D, the two line data 73*a*, 73*b* are identified. The line data 73*a* has a vertical width of h1 dots, and the line data 73*b* has a vertical width of h2 dots.

Next, the process of identifying an upper blank 74*a*, lower blank 7*c* and line data 73 which is executed in step S205 shown in FIG. 6 will be described in detail by reference to FIG. 8.

Figure 8:
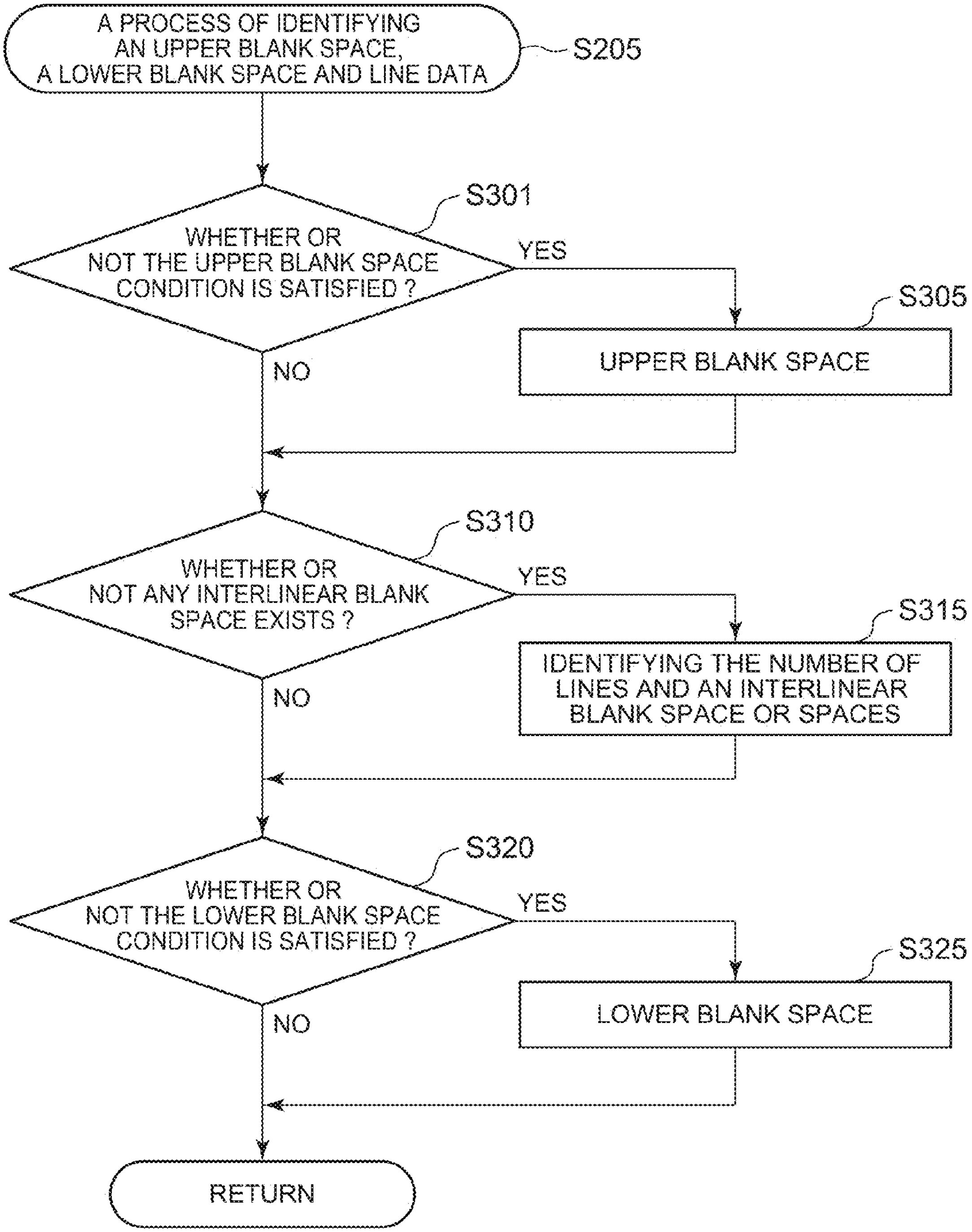
FIG. 8 is a flowchart showing an example of an upper blank space, lower blank space, interlinear spacing and line data identifying process executed by the printing apparatus according to the embodiment of the invention.

In step S301, as shown in FIG. 8, the control unit 40 determines whether or not the upper blank space condition is satisfied based on the dot values of the image data 71. To described this in detail, the control unit 40 determines that the upper blank space condition is satisfied when it determines that a plurality of lines having a dot value of "0" exist continuously downwards from the uppermost line based on the dot value of each of the horizontal lines of the image data 71 and identifies the area that satisfies the upper blank space condition as the upper blank 74 (step S305), proceeding to a process in Step 310. On the other hand, if the control unit 40 determines in step S301 that the upper blank condition is not satisfied, the flow of the process proceeds to step S310.

Next, the control unit 40 confirms whether or not any interlinear blank space exists (step S310). To described this in detail, the control unit 40 attempts to detect line data 73 where a plurality of lines having a dot value of "1" or "more than 1" exist continuously based on the dot value of each of the horizontal lines of the image data 71. If the control unit 40 detects a plurality of line data 73, the control unit 40 identifies the number of lines and an interlinear blank space or spaces between the plurality of line data 73 as an interlinear spacing 74*b* (step S315), proceeding to a process in step S320. On the other hand, if the control unit 40 detects only one line data 73 and detects no interlinear blank space, the flow proceeds to the process in step S320.

Next, the control unit 40 determines whether or not the lower blank space condition is satisfied (S320). To describe this in detail, if the control unit 40 determines based on the dot value of each of the horizontal line of the image data 71 that a plurality of lines having a dot value of "0" exist continuously downwards to the lowest line that is a final line in the image data 71, the control unit 40 then determines that the lower blank space condition is satisfied and identifies the area in question as the lower blank space 74*c* (step S325), proceeding to the process in step S210 shown in FIG. 6. On the other hand, if the control unit 40 determines in the process in step S320 that the lower blank space condition is not satisfied, proceeding to a process in step S210 shown in FIG. 6.

In step S210, the control unit 40 executes the blank space detecting device 40*c* to execute a process of identifying a front blank space, a rear blank space and line data 73 based on a dot value of each of vertical lines of the image data 71.

Figure 9A:
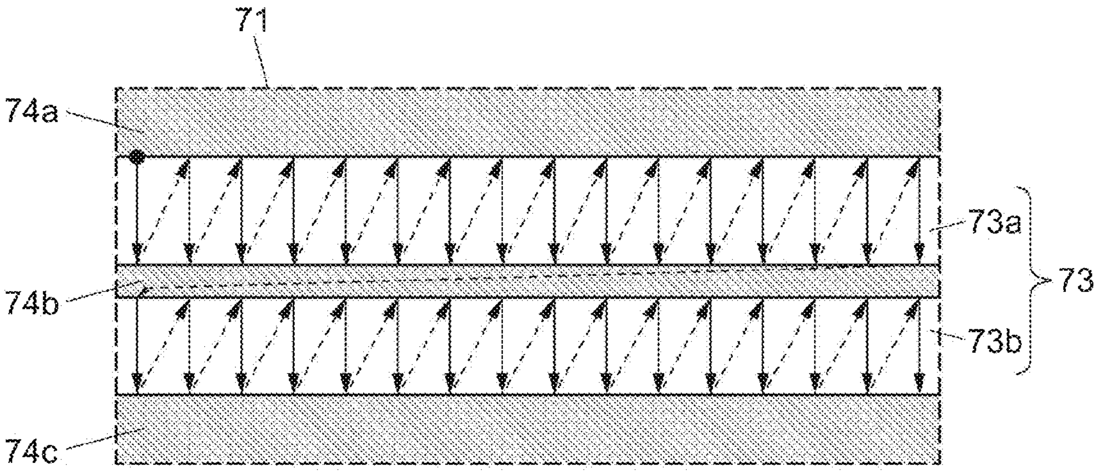
FIGS. 9A and 9B are a diagram showing an example of a procedure for a label preparation process executed by the printing apparatus according to the embodiment of the invention.

FIG. 9 shows an example of a procedure for a process of preparing a label by the printing apparatus 1. As shown in FIG. 9A, the control unit 40 executes a process of confirming whether or not the dot value of each of the vertical lines is "0" or "1", "more than 1" for areas which are identified as the line data 73 in the image data 71, this process being executed sequentially from a leftmost line to a rightmost line.

Figure 9B:
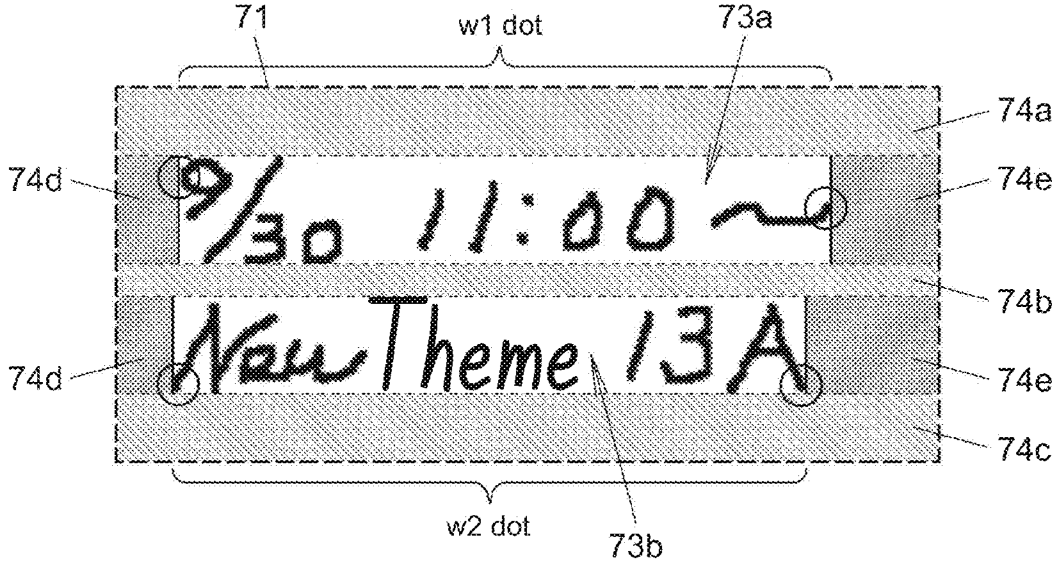

As shown in FIG. 9B, when a plurality of lines having a dot value of "0" exist continuously from the leftmost line, the control unit 40 identifies the area defined from the leftmost line to the line having the dot value of "0" that lies just before a line having a dot value of "1" or "more than 1" as a front blank space 74*d*. Then, the control unit 40 identifies an area where a plurality of lines having a dot value of "0" exist continuously to the rightmost line as a rear blank space 74*e* of the lines. In this embodiment, in the two line data 73*a*, 73*b*, the control unit 40 identifies that a longitudinal or horizontal width of the first line data 73*a* is w1 dots and a longitudinal or horizontal width of the second line data 73*b* is w2 dots, as shown FIG. 9B.

Figure 10:
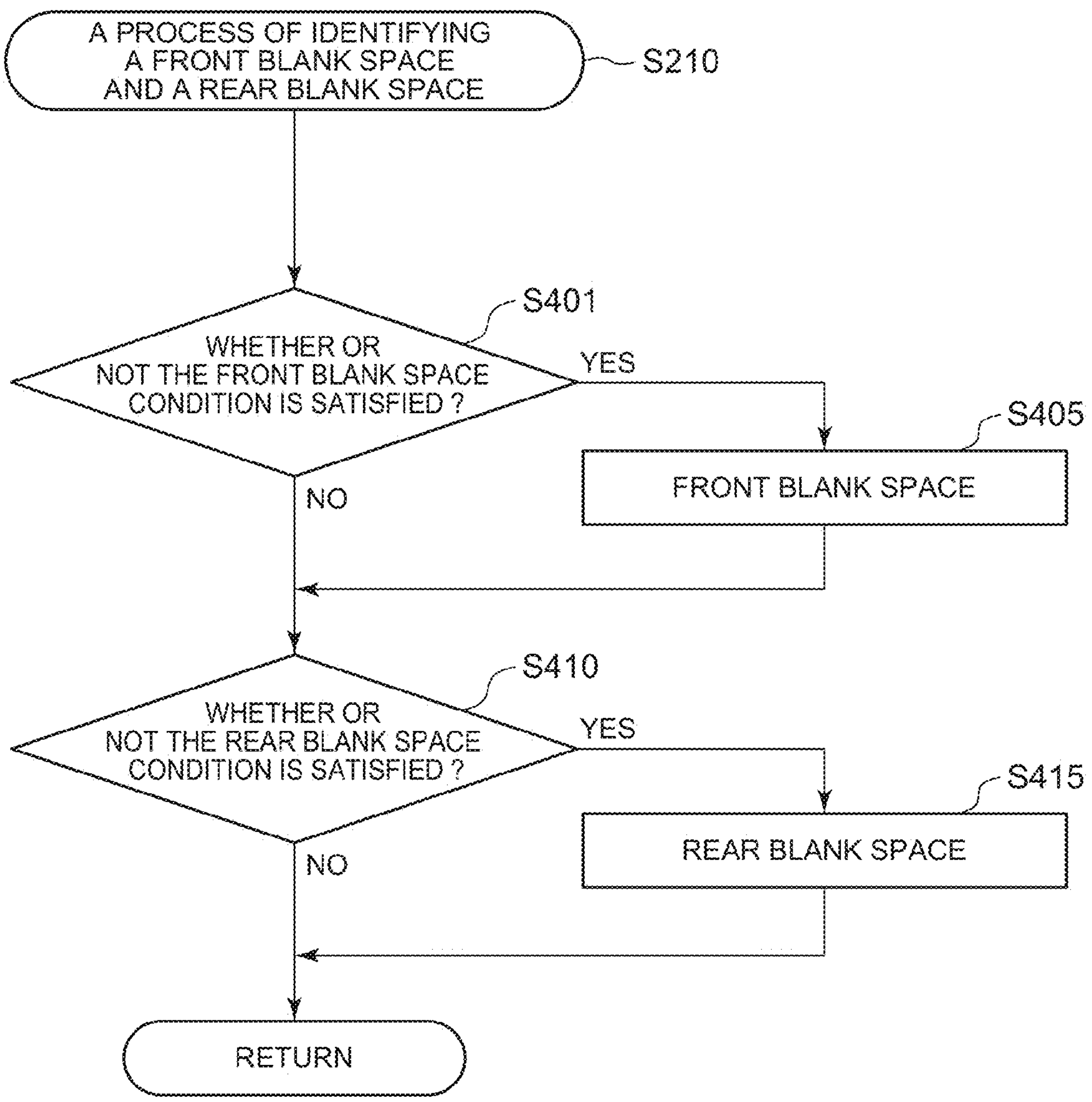
FIG. 10 is a flowchart showing an example of a front blank space, rear blank space and line data identifying process executed by the printing apparatus according to the embodiment of the invention.

FIG. 10 is a flowchart showing an example of a process of identifying a front blank space 74*d*, a rear blank space and line data 73 by the printing apparatus according to the embodiment of the invention. The process in step S210 shown in FIG. 6 will be described by reference to FIG. 10.

In step S401, the control unit 40 determines whether or not the front blank space condition is satisfied based on the dot value of the image data 71. To describe this in detail, if the control unit 40 confirms based on the dot value of each of the vertical lines of the image data 71 for each line data 73 that a plurality of lines having a dot value of "0" exist continuously from the leftmost line, the control unit 40 then determines that the front blank space condition is satisfied and identifies the area that satisfies the front blank space condition as a front blank space 74*d* (step S405), proceeding to a process in step S410. On the other hand, if the control unit 40 determines in step S401 that the front blank space condition is not satisfied, the flow proceeds to the process in step S410.

Next, the control unit 40 determines whether or not the rear blank space condition is satisfied (step S410). To describe this in detail, if the control unit 40 confirms based on the dot value of each of the vertical lines of the image data 71 that a plurality of lines having a dot value of "0" exist continuously to the rightmost line, the control unit 40 determines that the rear blank space condition is satisfied and identifies the area that satisfies the rear blank space condition as a rear blank space 74*e* (step S415), proceeding to the process in step S215 shown in FIG. 6.

As shown in FIG. 6, in step S215, when the upper blank space 74*a* and the lower blank space 74*c* are wider than a specified value, the control unit 40 executes a process of deleting the upper blank space 74*a* and the lower blank space 74*b* from the image data 71 and further executes a process of deleting the front blank space 74*d* and the rear blank space 74*e* as required.

Next, in step S220, the control unit 40 determines whether or not a plurality of line data 73 are extracted from the image data 71. When the plurality of line data 73 are not extracted from the image data 71 but one line data 73 is extracted therefrom, the control unit 40 generates printing data 72 by executing a process of executing a size conversion on the extracted line data 73 so as to match the line data 73 extracted to the tape width of the tape member 31 (step S223), proceeding to a process in step S120.

In addition, if the control unit 40 determines in step 220 shown in FIG. 6 that the plurality of line data 73 are extracted from the image data 71, the control unit 40 executes the alignment processing device 40*d* to execute a process of aligning the plurality of line data 73 to extend along the conveying direction of the tape member 31 which is the print receiving tape (step S225).

Figure 11A:
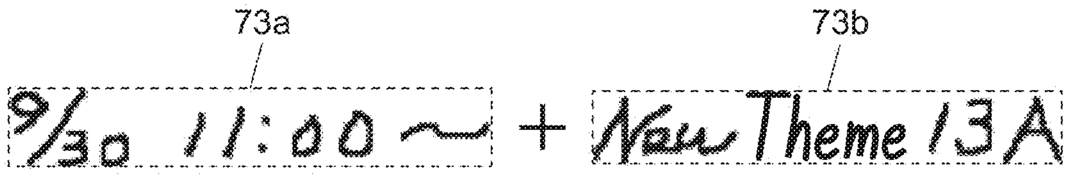
FIGS. 11A, 11B and 11C are a diagram showing an example of a procedure for a label preparation process executed by the printing apparatus according to the embodiment of the invention.

FIG. 11 shows diagrams showing one example of a procedure for a process of preparing label by the printing apparatus 1. In step S225 shown in FIG. 6, as shown in FIG. 11A, the alignment processing device 40*d* executes a process of aligning a plurality of line data 73*a*, 73*b* along the conveying direction of the print receiving tape. To describe this in detail, when the plurality of line data 73*a*, 73*b* are extracted from the image data 71, the control unit 40 disposes the subordinate line data 73*b* so as to lie adjacent to a right end of the superordinate line data 73*a*. In the printing apparatus 1 of this embodiment, while the plurality of line data 73*a*, 73*b* are aligned in the rightward direction, the invention is not limited this form, and hence, for example, the plurality of line data 73*a*, 73*b* may be made to be switched between a configuration where they are aligned in the rightward direction and a configuration where they are aligned in the leftward direction.

Next, in step S230 shown in FIG. 6, the control unit 40 executes individually on the plurality of line data 73*a*, 73*b* a process of converting them into printing data 72 having a size that matches the width of the tape member 31 that is the print receiving tape. To describe this in detail, as shown in FIG. 11B, a size conversion process is executed so that a vertical length of each line data 73 substantially coincides with the width of the tape member 31.

Figure 11B:
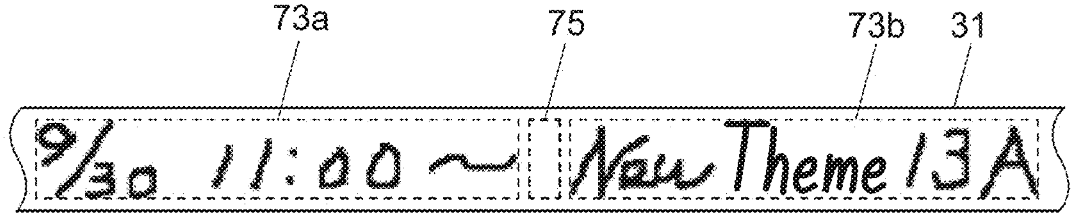

Next, in step S235 shown in FIG. 6, by executing the alignment processing device 40*d* as required, the control unit 40 executes a process of providing a certain amount of blank space 75 between the plurality of line data 73 as shown in FIG. 11B. Thus, the control unit 40 executes the process of controlling the spacing between the plurality of line data 73 to thereby generate printing data 72. Regarding this interlinear spacing as the blank space 75, the control unit 40 may allow the size of the blank space to be controlled by a signal outputted from the touch panel inputting device 4 by the operation of the user.

Although in step S220, the control unit 40 determines whether or not the plurality of line data 73 are extracted, and if the control unit 40 determines that the plurality of line data 73 are extracted, the predetermined aligning process (step S225) is automatically executed, the invention is not limited to this form. For example, when a plurality of line data 73 are extracted from the image data 71, the control unit 40 first may cause a selection screen to be displayed on the touch panel display 3 from which the user can select either of a process of executing the size conversion process on the plurality of line data 73 resulting from deleting the respective blank spaces from the image data 71 so to match the plurality of line data 73 to the tape width of the tape member 31 without aligning them for printing and a process of executing the aligning process (step S225) on the plurality of line data 73 before the size conversion process for printing, the selection screen being displayed together with printing images that results from the respective processes to be selected. Then, the control unit 40 receives a signal signaling the selection by the user and executes the predetermined process designated by the signal.

Then, the flow proceeds to step S120 shown in FIG. 5, where the control unit 40 stores the printing data 72 generated by the series of processes in the printing data memory area 42*a*.

Figure 11C:
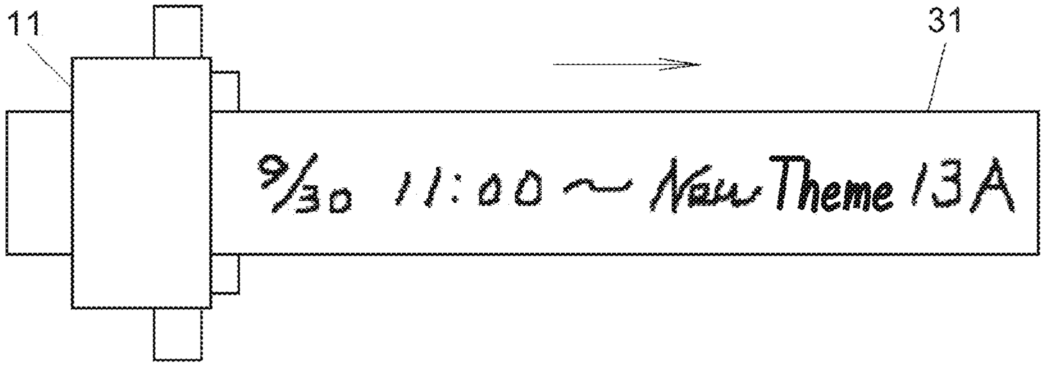

Next, in step S125 shown in FIG. 5, the control unit 40 executes the printing processing device 40*f*, whereby the control unit 40 controls the thermal head 11 that is the printing device based on the printing data 72 stored in the printing data memory area 42*a* to thereby make the predetermined print on the tape member 31 that is the print receiving tape, as shown in FIG. 11C.

Thus, as has been described heretofore, in the embodiment of the invention, the printing apparatus 1 includes the tape width detection processing device 40*a* that detects the tape width of the tape member 31 that is the print receiving tape based on the signals from the tape width detection switches 16, the image data generation device 40*b* that generates the image data 71 based on the touch detection signal supplied from the handwritten character inputting area 5 of the touch panel inputting device 4 functioning as the touch panel by the user touching the touch panel to execute the handwriting input, the blank space detection device 40*c* that executes the process of detecting the line data 73, the upper blank space 74*a* and the lower blank space 74*c* based on the dot value of each of the horizontal lines of the image data 71, the printing data generation device 40*e* that generates the printing data 72 by, when the upper blank space 74*a* and the lower blank space 74*c* are wider than the specified value, deleting the upper blank 74*a* and the lower blank 74*c* from the image data 71 and executing the size conversion to enlarge or reduce the line data 73 so as to match the line data 73 to the tape width of the tape member 31 that is the print receiving tape, and the printing processing device 40*f* that executes the printing process based on the printing data 72.

Namely, according to the embodiment of the invention, it is possible to provide the printing apparatus 1 that can produce a highly visible print on the tape member 31 that is the print receiving tape within a short period of time through the simple processes even when the tape member 31 having the narrow tape width is set in the printing device 1 and the hand writing input is performed in the narrow space within the handwritten character inputting area 5 by the user, the printing method for the printing apparatus 1 and the program 41*c* that makes the computer realizes the printing method for the printing apparatus 1.

Additionally, in the embodiment of the invention, the blank space detection device 40*c* executes the process of identifying the front blank space 74*d* and the rear blank space 74*e* of the line data 73 based on the dot value of each of the vertical lines of the image data 71, and the printing data generation device 40*e* executes the process of generating the printing data 72 by deleting the front blank space 74*dd* and the rear blank space 74*e* from the image data 71. Thus, according to the embodiment of the invention, it is possible to provide the printing apparatus 1 that can reduce the excess length portion of the tape member 31 along the tape conveying direction at the time of printing, the printing method for the printing apparatus 1 and the program 41*c* that makes the computer realize the printing method for the printing apparatus 1.

In addition, in the embodiment of the invention, the printing apparatus 1 includes further the alignment processing device 40*d* that aligns the plurality of line data 73 end to end in the horizontal direction which is the tape conveying direction into the single line when the blank space detection device 40*c* detects the plurality of line data 73 and the interlinear spacing 74*b* based on the dot value of each of the horizontal lines. Thus, it is possible to provide the printing apparatus 1 that can produce a highly visible print on the tape member 31 even when the user inputs data in a plurality of lines in the handwritten character inputting area 5 through hand writing, the printing method for the printing apparatus 1 and the program 41*c* that makes the computer realize the printing method for the printing apparatus 1.

Figure 12:
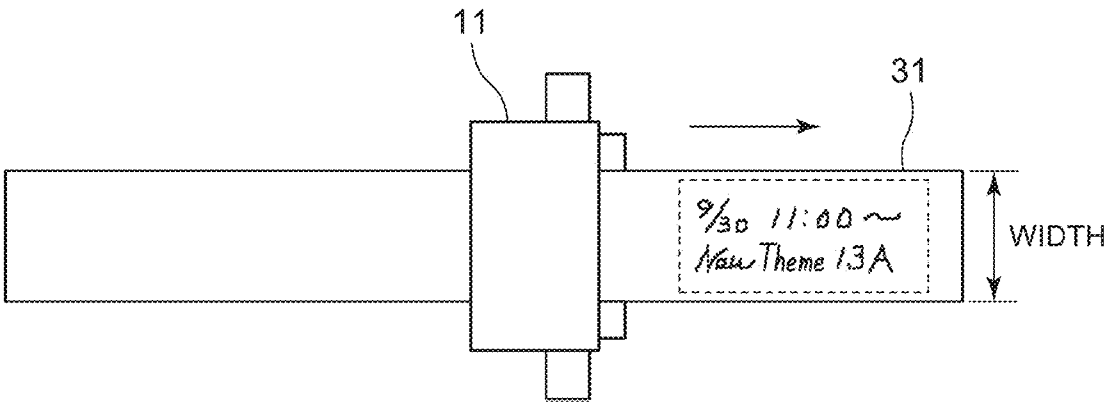
FIG. 12 is a diagram showing an example of a printing result by a printing apparatus according to a comparison example.

For example, in the printing apparatus according to the comparison example, when the narrow tape member 31 is set in the printing apparatus and handwritten data in a plurality of lines is inputted in the handwritten character inputting area 5 of the touch panel inputting device 4, as shown in FIG. 12, the data is simply reduced to match the tape width of the tape member 31 for printing, which reduces the size of characters printed, resulting in deteriorated visibility. However, in the printing apparatus 1 according the invention, since the aforesaid process is executed, as shown in FIG. 11C, the highly visible print can be produced by aligning the plurality of line data 73 end to end on the narrow tape member 31.

Additionally, according to the embodiment of the invention, the alignment processing device 40*d* executes the process of providing the blank space 75 between the plurality of data line 73 so aligned. Therefore, according to the embodiment of the invention, it is possible to provide the printing apparatus 1 that can produce a highly visible print, compared with a case where the plurality of line data 73 are simply aligned without any space, the printing method for the printing apparatus 1 and the program 41*c* that makes the computer realize the printing method for the printing apparatus 1. In addition, a configuration may be adopted in which the size of the blank space 75 can be controlled by the user.

Further, the processes shown in the flowcharts described in the embodiment of the invention can be applied to various types of equipment in such a state that the processes are written in a recording medium such as a magnetic disk, an optical disk and a semiconductor memory, for example, as the program 41*c* that can make the computer realizes the processes. Alternatively, the processes can be applied to various types of equipment by being transmitted by a communication medium. In this way, the respective processes that are described in the embodiment are stored in a desired recording medium and the program 41*c* is executed by one other computer. Also, in this case, the same function and advantage can be obtained as those obtained when the printing apparatus 1 of the embodiment is used. Note that the computer is not limited to the computer that is incorporated in the printing apparatus described in the embodiment, and hence, various types of computers are included, provided that they can read the program 41*c* that is stored in a recording medium and include an operation system such as a CPU that executes the control operations according to the printing control program read thereby.

While the invention has been described based on the specific embodiment, the embodiment is presented as the example, and hence, there is no intention to limit the scope of the invention by the embodiment. This novel embodiment can be carried out in other various forms, and various omissions, replaces or modifications can be made thereto without departing from the spirit and scope of the invention. The embodiment and its modified examples are included in the spirit and scope of the invention and are also included in the scopes of the inventions described in claims and their equivalents.

What is claimed is:

1. A printing apparatus that prints on a print receiving tape, the apparatus comprising:

an image data generating device configured to generate image data based on a touch detection signal supplied from a touch panel when the touch panel is touched to execute a hand writing input;

a blank space detecting device configured such that, by scanning all lines of the image data line by line, (i) an area where a line which includes at least one dot having a dot value equal to or greater than a predetermined threshold exists in the lines of the image data having been scanned is detected as line data that corresponds to an area where the hand writing input is executed by the touch panel, and (ii) an area where a line which includes no dot having a dot value equal to or greater than the predetermined threshold exists in the lines of the image data having been scanned is detected as blank space data that corresponds to an area where the hand writing input by the touch panel is not executed;

an alignment processing device configured such that, when a plurality of the line data corresponding to a plurality of lines of the hand writing input are detected in the image data by the blank space detecting device, the plurality of the line data, which are obtained by deleting the blank space data from the image data, are aligned end to end into a single line along a tape conveying direction such that a beginning of one of the plurality of line data is adjacent to an end of another of the plurality of line data along the tape conveying direction;

a printing data generating device configured to generate printing data by executing a size conversion of the plurality of the line data that are aligned end to end into the single line along the tape conveying direction so as to match the plurality of the line data to the print receiving tape; and a printing processing device configured to execute a printing process on the print receiving tape based on the printing data.

2. The printing apparatus as set forth in claim 1, wherein the blank space detecting device executes a process of detecting (i) as an upper blank space, an area where a plurality of lines which include no dot having a dot value equal to or greater than the predetermined threshold continuously exist from an uppermost line of the image data to a line preceding the line data, (ii) as an interlinear blank space, an area between the plurality of the line data when the plurality of the line data are detected in the image data, and (iii) as a lower blank space, an area where a plurality of lines which include no dot having a dot value equal to or greater than the predetermined threshold continuously exist from a line following the line data to a lowermost line of the image data, and wherein the alignment processing device executes a process of deleting the upper blank space, the interlinear blank space, and the lower blank space from the image data.

3. The printing apparatus as set forth in claim 1, wherein the blank space detecting device scans an area, which is detected as the line data in the image data, line by line in a vertical direction so as to detect (i) as a front blank space, an area where a plurality of lines which include no dot having a dot value equal to or greater than the predetermined threshold continuously exist from a leftmost line of the image data to a line preceding the line data, and (ii) as a rear blank space, an area where a plurality of lines which include no dot having a dot value equal to or greater than the predetermined threshold continuously exist from a line subsequent to the line data to a rightmost line of the image data, and wherein the alignment processing device executes a process of deleting the front blank space and the rear blank space from the image data.

4. The printing apparatus as set forth in claim 1, wherein the printing data generating device enlarges or reduces the plurality of the line data, which are aligned end to end into the single line along the tape conveying direction by the alignment processing device, so as to match the line data to the print receiving tape.

5. A printing method for printing on a print receiving tape by a printing apparatus, the method comprising:

generating image data based on a touch detection signal supplied from a touch panel when the touch panel is touched to execute a hand writing input;

scanning all lines of the image data line by line;

detecting an area where a line which includes at least one dot having a dot value equal to or greater than a predetermined threshold exists in the lines of the image data having been scanned as line data that corresponds to an area where the hand writing input is executed by the touch panel;

detecting an area in which a line which includes no dot having a dot value equal to or greater than the predetermined threshold exists in the lines of the image data having been scanned as blank space data that corresponds to an area where the hand writing input by the touch panel is not executed;

when a plurality of the line data corresponding to a plurality of lines of the hand writing input are detected in the image data, aligning the plurality of line data, which are obtained by deleting the blank space data from the image data, end to end into a single line along a tape conveying direction such that a beginning of one of the plurality of line data is adjacent to an end of another of the plurality of line data along the tape conveying direction;

generating printing data by executing a size conversion of the plurality of the line data that are aligned end to end in the single line along the tape conveying direction so as to match the plurality of the line data to the print receiving tape; and executing printing on the print receiving tape based on the printing data.

6. The printing method as set forth in claim 5, further comprising:

detecting, as an upper blank space, an area where a plurality of lines which include no dot having a dot value equal to or greater than the predetermined threshold continuously exist from an uppermost line of the image data to a line preceding the line data;

detecting, as an interlinear blank space, an area between the plurality of the line data when the plurality of the line data are detected in the image data;

detecting, as a lower blank space, an area where a plurality of lines which include no dot having a dot value equal to or greater than the predetermined threshold continuously exist from a line following the line data to a lowermost line of the image data; and deleting the upper blank space, the interlinear blank space, and the lower blank space from the image data.

7. The printing method as set forth in claim 5, further comprising:

scanning an area which is detected as the line data in the image data line by line in a vertical direction;

detecting, as a front blank space, an area where a plurality of lines which include no dot having a dot value equal to or greater than the predetermined threshold continuously exist from a leftmost line of the image data to a line preceding the line data;

detecting, as a rear blank space, an area where a plurality of lines which include no dot having a dot value equal to or greater than the predetermined threshold continuously exist from a line subsequent to the line data to a rightmost line of the image data; and deleting the front blank space and the rear blank space from the image data.

8. The printing method as set forth in claim 5, further comprising, in generating the printing data, enlarging or reducing the plurality of the line data, which are aligned end to end in the single line along the tape conveying direction, so as to be matched to the print receiving tape.

9. A non-transitory computer readable recording medium having a program stored thereon which is executable to control a computer of a printing apparatus that prints characters on a print receiving tape to perform functions comprising:

generating image data based on a touch detection signal supplied from a touch panel when the touch panel is touched to execute a hand writing input;

scanning all lines of the image data line by line;

detecting an area where a line which includes at least one dot having a dot value equal to or greater than a predetermined threshold exists in the lines of the image data having been scanned as line data that corresponds to an area where the handwriting input is executed by the touch panel;

detecting an area in which a line which includes no dot having a dot value equal to or greater than the predetermined threshold exists in the lines of the image data having been scanned as blank space data that corresponds to an area where the hand writing input by the touch panel is not executed;

when a plurality of the line data corresponding to a plurality of lines of the hand writing input are detected in the image data, aligning the plurality of line data, which are obtained by deleting the blank space data from the image data, end to end into a single line along a tape conveying direction such that a beginning of one of the plurality of line data is adjacent to an end of another of the plurality of line data along the tape conveying direction;

generating printing data by executing a size conversion of the plurality of the line data that are aligned end to end in the single line along the tape conveying direction so as to match the plurality of the line data to the print receiving tape; and executing a printing process on the print receiving tape based on the printing data.

10. The non-transitory computer readable recording medium as set forth in claim 9, wherein the program is executable to control the computer to perform further functions comprising:

detecting, as an upper blank space, an area where a plurality of lines which include no dot having a dot value equal to or greater than the predetermined threshold continuously exist from an uppermost line of the image data to a line preceding the line data;

detecting, as an interlinear blank space, an area between the plurality of the line data when the plurality of the line data are detected in the image data;

detecting, as a lower blank space, an area where a plurality of lines which include no dot having a dot value equal to or greater than the predetermined threshold continuously exist from a line following the line data to a lowermost line of the image data; and deleting the upper blank space, the interlinear blank space, and the lower blank space from the image data.

11. The non-transitory computer readable recording medium as set forth in claim 9, wherein the program is executable to control the computer to perform further functions comprising:

scanning an area which is detected as the line data in the image data line by line in a vertical direction;

detecting, as a front blank space, an area where a plurality of lines which include no dot having a dot value equal to or greater than the predetermined threshold continuously exist from a leftmost line of the image data to a line preceding the line data;

detecting, as a rear blank space, an area where a plurality of lines which include no dot having a dot value equal to or greater than the predetermined threshold continuously exist from a line subsequent to the line data to a rightmost line of the image data; and deleting the front blank space and the rear blank space from the image data.

12. The non-transitory computer readable recording medium as set forth in claim 9, wherein the program is executable to control the computer to perform a further function of, in generating the printing data, enlarging or reducing the plurality of the line data, which are aligned end to end in the single line along the tape conveying direction, so as to match the plurality of the line data to the print receiving tape.

13. The printing apparatus as set forth in claim 1, wherein the alignment processing device provides spacing between each of the plurality of the line data which are aligned end to end into the single line along the tape conveying direction.

14. The printing method as set forth in claim 5, further comprising providing spacing between each of the plurality of the line data which are aligned end to end into the single line along the tape conveying direction.

15. The non-transitory computer readable recording medium as set forth in claim 9, wherein the program is executable to control the computer to perform a further function of providing spacing between each of the plurality of the line data which are aligned end to end into the single line along the tape conveying direction.

* * * * *